United States Patent
Cornett et al.

(10) Patent No.: US 11,805,081 B2
(45) Date of Patent: Oct. 31, 2023

(54) APPARATUS AND METHOD FOR BUFFER MANAGEMENT FOR RECEIVE SEGMENT COALESCING

(71) Applicant: Intel Corporation, Santa Clara, CA (US)

(72) Inventors: Linden Cornett, Portland, OR (US); Noam Elati, Zichron yaakov (IL); Anjali Singhai Jain, Portland, OR (US); Parthasarathy Sarangam, Portland, OR (US); Eliel Louzoun, Jerusalem (IL); Manasi Deval, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 106 days.

(21) Appl. No.: 16/807,014

(22) Filed: Mar. 2, 2020

(65) Prior Publication Data

US 2020/0204503 A1    Jun. 25, 2020

Related U.S. Application Data

(60) Provisional application No. 62/813,554, filed on Mar. 4, 2019.

(51) Int. Cl.
*H04L 49/901* (2022.01)
*H04L 69/16* (2022.01)
(Continued)

(52) U.S. Cl.
CPC ........ *H04L 49/901* (2013.01); *G06F 12/0802* (2013.01); *H04L 69/16* (2013.01); *G06F 2212/154* (2013.01); *H04L 49/9057* (2013.01)

(58) Field of Classification Search
CPC ....... H04L 49/90; H04L 49/901; H04L 69/16; H04L 69/161; H04L 2012/5681;
(Continued)

(56) References Cited

U.S. PATENT DOCUMENTS 6,832,261 B1 * 12/2004 Westbrook .......... H04L 12/5601
370/394
6,977,930 B1 * 12/2005 Epps ....................... H04L 47/10
370/392
(Continued)

FOREIGN PATENT DOCUMENTS

WO   PCT/EP2018/067884   *   7/2018   ........... H04L 12/861

OTHER PUBLICATIONS

Intel, "Accelerating High-Speed Networking with Intel I/O Acceleration Technology", White Paper Intel I/O Acceleration Technology, https://www.intel.com/content/www/us/en/io/i-o-acceleration-technology-paper.html, created Jan. 4, 2007, downloaded Mar. 3, 2020, 8 pages.

*Primary Examiner* — Warner Wong
(74) *Attorney, Agent, or Firm* — Compass IP Law PC

(57) ABSTRACT

Packets received non-contiguously from a network are processed by a network interface controller by coalescing received packet payload into receive buffers on a receive buffer queue and writing descriptors associated with the receive buffers for a same flow consecutively in a receive completion queue. System performance is optimized by reusing a small working set of provisioned receive buffers to minimize the memory footprint of memory allocated to store packet data. The remainder of the provisioned buffers are in an overflow queue and can be assigned to the network interface controller if the small working set of receive buffers is not sufficient to keep up with the received packet rate. The receive buffer queue can be refilled based on either (Continued)

timers or when the number of buffers in the receive buffer queue is below a configurable low watermark.

22 Claims, 12 Drawing Sheets

(51) Int. Cl.
*G06F 12/0802* (2016.01)
*H04L 49/9057* (2022.01)

(58) Field of Classification Search
CPC .............. H04L 49/3018; H04L 49/3027; H04L 49/9057; H04L 47/00; H04L 47/34; H04L 47/622; H04L 47/624; H04L 1/1841; G06F 2212/154; G06F 12/02; G06F 12/0802; G06F 5/00; G06F 9/3855
See application file for complete search history.

(56) References Cited

U.S. PATENT DOCUMENTS

| | | | |
|---|---|---|---|
| 7,620,071 B2 | 11/2009 | Makineni et al. | |
| 7,936,757 B2 * | 5/2011 | Zhang | H04L 49/9057 370/392 |
| 7,953,094 B1 * | 5/2011 | Greene | H04L 49/9057 370/394 |
| 8,036,246 B2 | 10/2011 | Makineni et al. | |
| 10,164,889 B1 * | 12/2018 | Li | H04L 47/225 |
| 2003/0026277 A1 * | 2/2003 | Pate | H04L 47/34 370/412 |
| 2003/0223458 A1 * | 12/2003 | Mathews | H04L 12/5601 370/474 |
| 2006/0104303 A1 * | 5/2006 | Makineni | H04L 69/161 370/463 |
| 2007/0022212 A1 * | 1/2007 | Fan | H04L 69/166 709/238 |
| 2007/0064737 A1 * | 3/2007 | Williams | H04L 49/9063 370/473 |
| 2008/0037555 A1 * | 2/2008 | Biran | H04L 69/163 370/395.42 |
| 2010/0080231 A1 * | 4/2010 | Lala | H04L 49/9094 370/394 |
| 2014/0160935 A1 * | 6/2014 | Zecharia | H04L 47/34 370/235 |
| 2018/0063037 A1 * | 3/2018 | Edwards | H04L 49/505 |
| 2020/0228619 A1 * | 7/2020 | Zhang | H04L 67/568 |

* cited by examiner

US 11,805,081 B2

APPARATUS AND METHOD FOR BUFFER MANAGEMENT FOR RECEIVE SEGMENT COALESCING

RELATED APPLICATIONS

The present application claims the benefit of a priority date of U.S. provisional patent application Ser. No. 62/813,554 filed Mar. 4, 2019, the entire disclosure of which is incorporated herein by reference.

BACKGROUND

A network enables computers and other devices to communicate. Typically, data is sent across the network in a payload of a packet. A transport protocol known as Transmission Control Protocol (TCP) provides applications with a mechanism for establishing a flow and transferring data across the network.

TCP provides reliable transmission and ordered delivery of data between applications running on hosts communicating via an Internet Protocol (IP) network for internet applications such as email and file transfer. TCP uses a sequence number to identify each byte of data transmitted from a source to a destination. The sequence number identifies the order of the bytes sent so that the received data can be reconstructed in order in the destination.

BRIEF DESCRIPTION OF THE DRAWINGS

Features of embodiments of the claimed subject matter will become apparent as the following detailed description proceeds, and upon reference to the drawings, in which like numerals depict like parts, and in which:

Figure 1A:
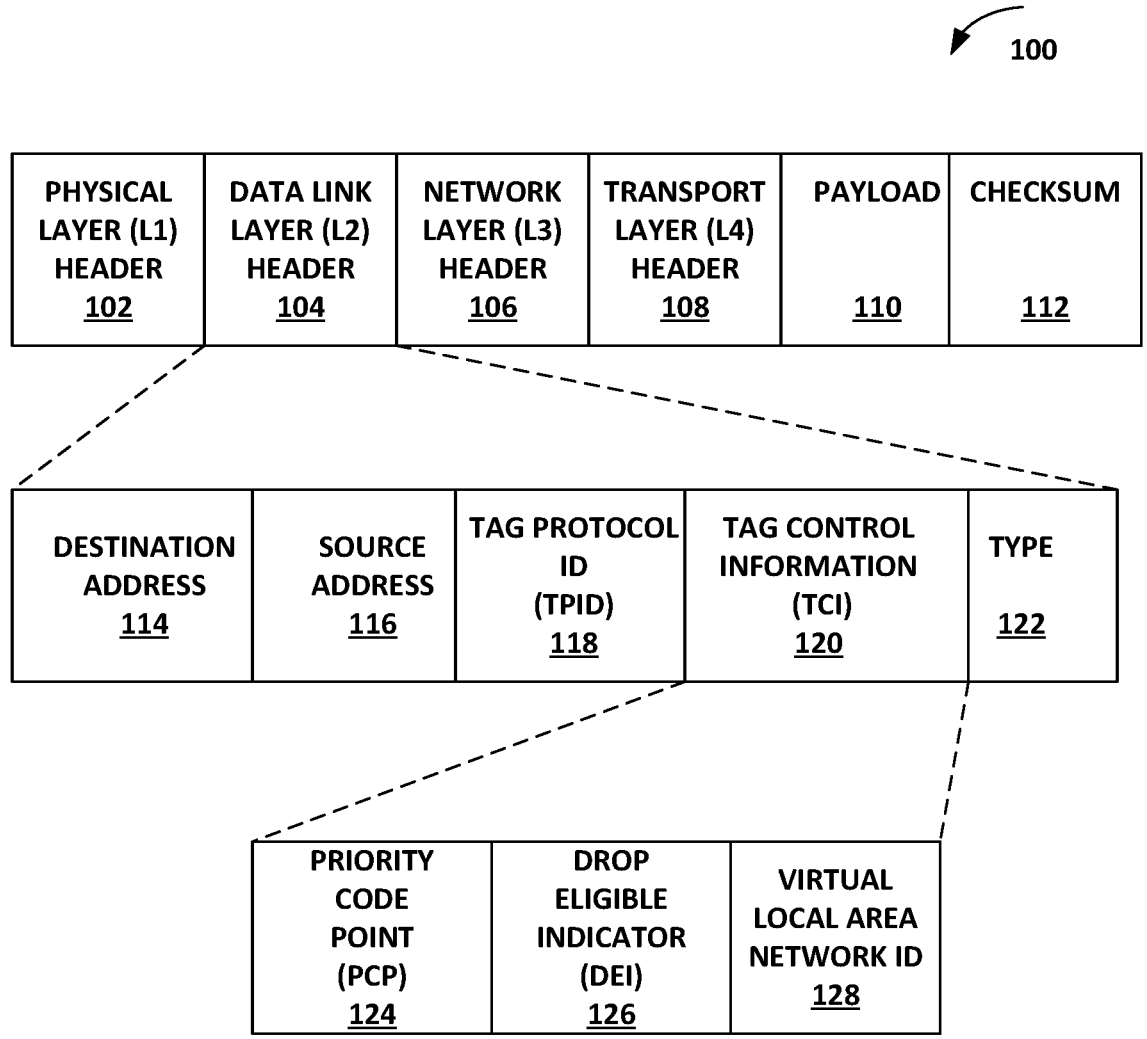
FIGS. 1A-1D illustrate a TCP/IP data packet that includes four layers of the Open Systems Interconnection (OSI) model.

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined only as set forth in the accompanying claims.

DESCRIPTION OF EMBODIMENTS

Generally, a TCP segment is sent across the network. A TCP/IP flow can be identified by data within headers in a TCP/IP packet, for example, by a tuple formed by a combination of the IP source address and IP destination address in the IP header and the TCP source port number and TCP destination port number in the TCP header and the protocol type.

Multiple received packets for a same TCP/IP flow can be coalesced into a single TCP/IP packet, reducing per-packet processing costs for faster TCP/IP processing. The coalescing of multiple received TCP/IP packets for a same TCP/IP flow can be referred to as Receive Side Coalescing or Receive Segment Coalescing (RSC).

Received TCP/IP packets are typically processed by a Network Interface Controller (NIC) in the system. The network interface controller typically stores the received TCP/IP packet's header and payload with subsequent received TCP/IP packets for a same TCP/IP flow (connection). The packet payload can be stored in system memory that is separate from the network interface controller. For example, a direct memory access (DMA) operation can be used to store the packet payload in the system memory at a location (packet buffer) specified by a buffer descriptor for the TCP/IP flow.

Receive segment coalescing in the network interface controller allows non-contiguous or contiguous TCP/IP packets received from the network for the same TCP/IP flow to be processed as a single packet in the system. As TCP/IP packets for the same TCP/IP flow are received by the network interface controller, the network interface controller can combine the payloads of the TCP/IP packets in system memory by physically storing the payloads contiguously or associating the payloads, for example, as nodes in a linked list.

After completion of the Receive Segment Coalescing, the network interface controller can write a combined header of the coalesced packet and the TCP/IP flow's descriptor(s) to system memory and can signal an interrupt to a processor to initiate processing by a TCP/IP stack of the coalesced TCP/IP packet payload stored in buffers in the system memory.

When packets from a multiple TCP/IP flows are received interleaved, the TCP/IP packet payload for the TCP/IP flow may be stored in non-contiguous buffers in a receive queue in the system memory, that is, scattered throughout the receive queue and interspersed with packets from other TCP/IP flows and single-receive packets. In this model, a receive processing thread needs to skip buffers and process backwards and forwards in a descriptor ring to collect the received payload for the TCP/IP flow which can result in inefficient receive queue processing.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described in order to provide a thorough understanding of various embodiments of the present invention. However, in certain instances, well-known or conventional details are not described in to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

The Open Systems Interconnection model (OSI model) is a conceptual model that partitions a communication system into abstraction layers. FIGS. 1A-1D illustrate a data packet that includes four layers of the OSI model. Referring to FIG. 1A, the data packet 100 includes a payload field 110, a checksum 112 and a header for each of the four layers of the OSI model, a physical layer (L1) header 102, a media access control (MAC) layer (L2) header 104, a networking layer (L3) header 106 and a transport layer (L4) header 108. In an embodiment, the media access control (MAC) layer (L2) header 104 may be an Ethernet header, the networking layer (L3) header 106 may be an Internet Protocol ("IP") header and the transport layer (L4) header 108 may be Transmission Control Protocol ("TCP").

In an embodiment in which the media access control (MAC) layer (L2) header 104 is an Ethernet header, the media access control (MAC) layer (L2) header 104 includes a destination address 114, a source address 116, an Institute of Electrical and Electronics Engineers (IEEE) 802.1q Tag Protocol IDentifier (TPID) field 118, an IEEE 802.1q Tag Control Information (TCI) field 120 and a length/type field 122. The TPID field is a 16-bit field that is set to a value of 0x8100 to identify the Ethernet frame as an IEEE 802.1Q-tagged frame.

The 16-bit TCI field 120 includes a 3-bit Priority Code Point field 124, a 1-bit Drop Eligible Indicator field 126 and a 12-bit Virtual Local Area Network ("VLAN") identifier 128. The Virtual Local Area Network identifier (VID) identifies the VLAN to which the Ethernet frame belongs.

The Priority Code Point field 124 refers to the IEEE 802.1p class of service and maps to an Ethernet frame priority level. Different Priority Code Point values can be used to prioritize different classes of traffic over a network. Priority Code Point is a mechanism for implementing quality of service (QoS) at the MAC layer. Eight different classes of service based on traffic type are available through the 3-bit Priority Code Point field 124. The user priority stored in the Priority Code Point field 124 is one of 8 priority levels, with 7 being the highest priority and 0 being the lowest priority. A priority level of 0 is the default priority.

The Drop Eligible Indicator field 126 may be used separately or in conjunction with the Priority Code Point field 124 to indicate Ethernet frames eligible to be dropped in the presence of congestion.

Figure 1B:
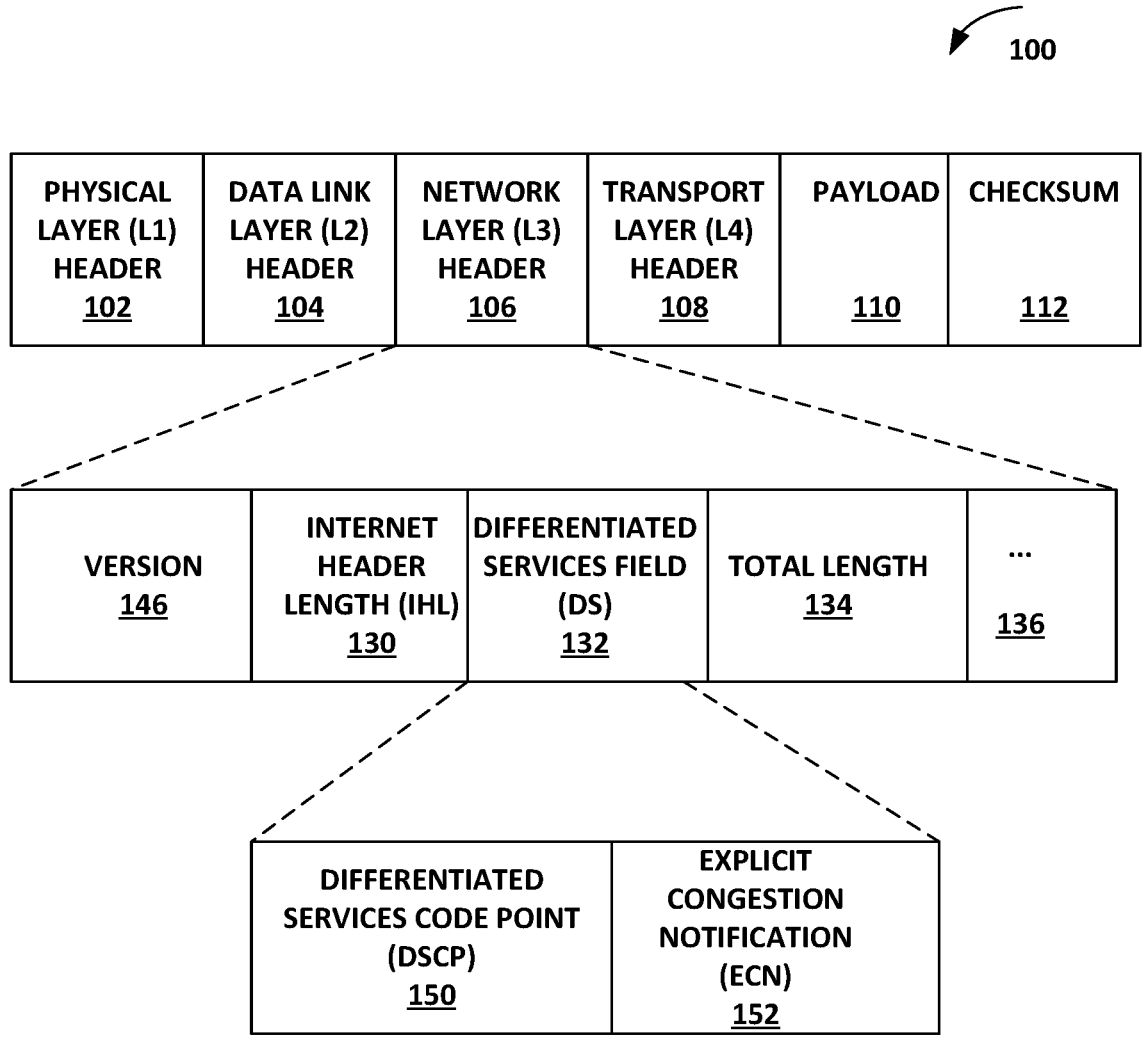

Referring to FIG. 1B, in an embodiment in which the networking layer (L3) header 106 is Internet Protocol ("IP") version 4, the networking layer (L3) header 106 includes a version field 146 that stores the IP version, an Internet Header length (IHL) field 130, a differentiated services (DS) field 132 and a total length field 134. The differentiated services (DS) field 132 includes a Differentiated Services Code Point (DSCP) field 150 and an explicit congestion notification (ECN) field 152.

Figure 1C:
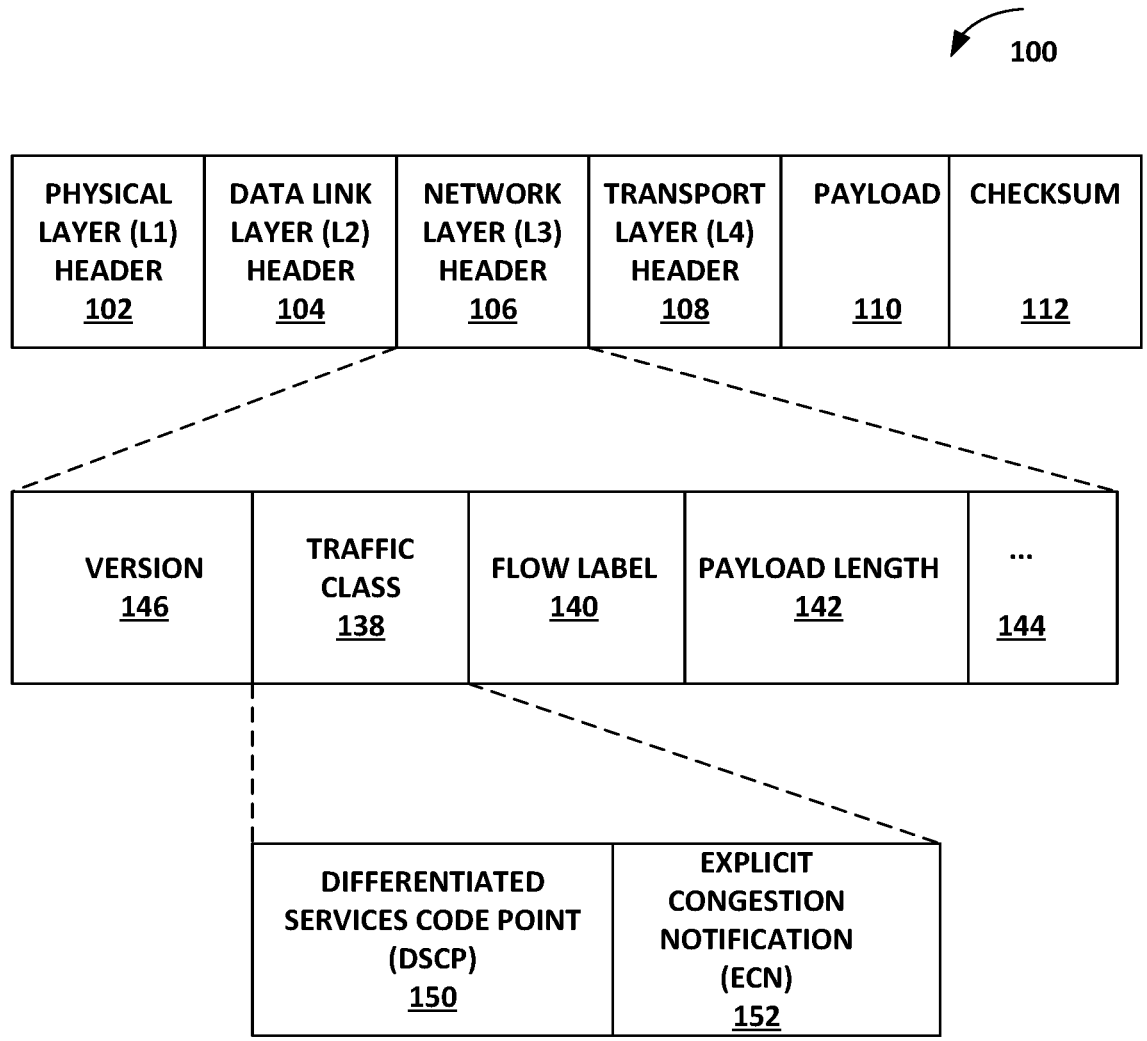

Referring to FIG. 1C, in an embodiment in which the networking layer (L3) header 106 is Internet Protocol ("IP") version 6 Internet Protocol header, the networking layer (L3) header 106 includes a version field 146 that stores the IP version, a Traffic Class field 138, a Flow Label field 140 and a payload length field 142. The Traffic Class field 138 includes Differentiated Services Code Point (DSCP) field 150 and explicit congestion notification (ECN) field 152.

Figure 1D:
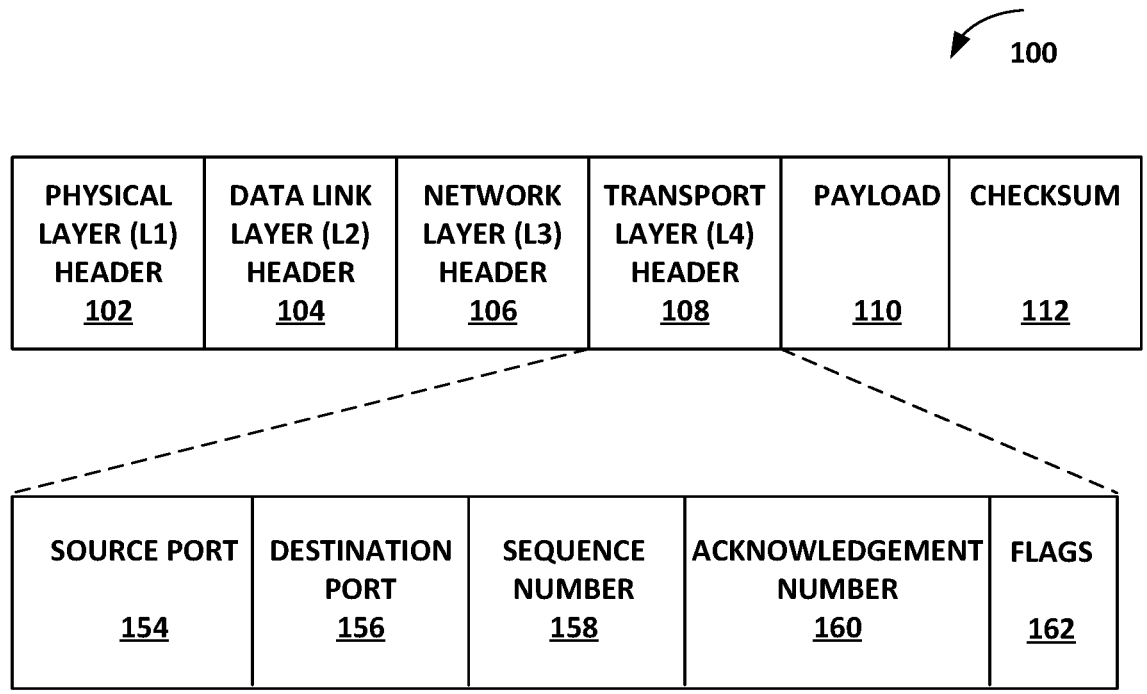

Referring to FIG. 1D, in an embodiment in which the transport layer (L4) header 108 is Transmission Control Protocol ("TCP"), the transport layer header (L4) 108 includes a TCP source port 154, a TCP destination port 156, a TCP sequence number 158, an acknowledgment number 160 and flags 162.

In the TCP protocol, each transmitted byte has an associated sequence number that is used to identify the order of transmitted bytes so that the bytes can be reconstructed in order, regardless of any packet reordering, or packet loss that may occur during transmission. The sequence number of a first byte in a sequence of bytes to be transmitted is chosen by the transmitter for the first packet, with a SYN flag set in flags 162. An acknowledgement is sent using an ACK flag in flags 162 with a sequence number by the receiver of data to inform the sender that the transmitted data has been received The TCP source port 154 stores an identifier for the sending port. The TCP destination port 156 stores an identifier for the destination port. The TCP sequence number 158 stores an identifier for the first byte transmitted in this payload. If a SYN flag is set in flags 162, the TCP sequence number 158 stores the initial sequence number. If the SYN flag is clear in flags 162, the TCP sequence number 158 stores the accumulated sequence number of the first data byte for a segment for a current session. If the ACK flag in flags 162 is set, the acknowledgement number is the expected next sequence number and an acknowledgment of receipt of all prior bytes.

Figure 2:
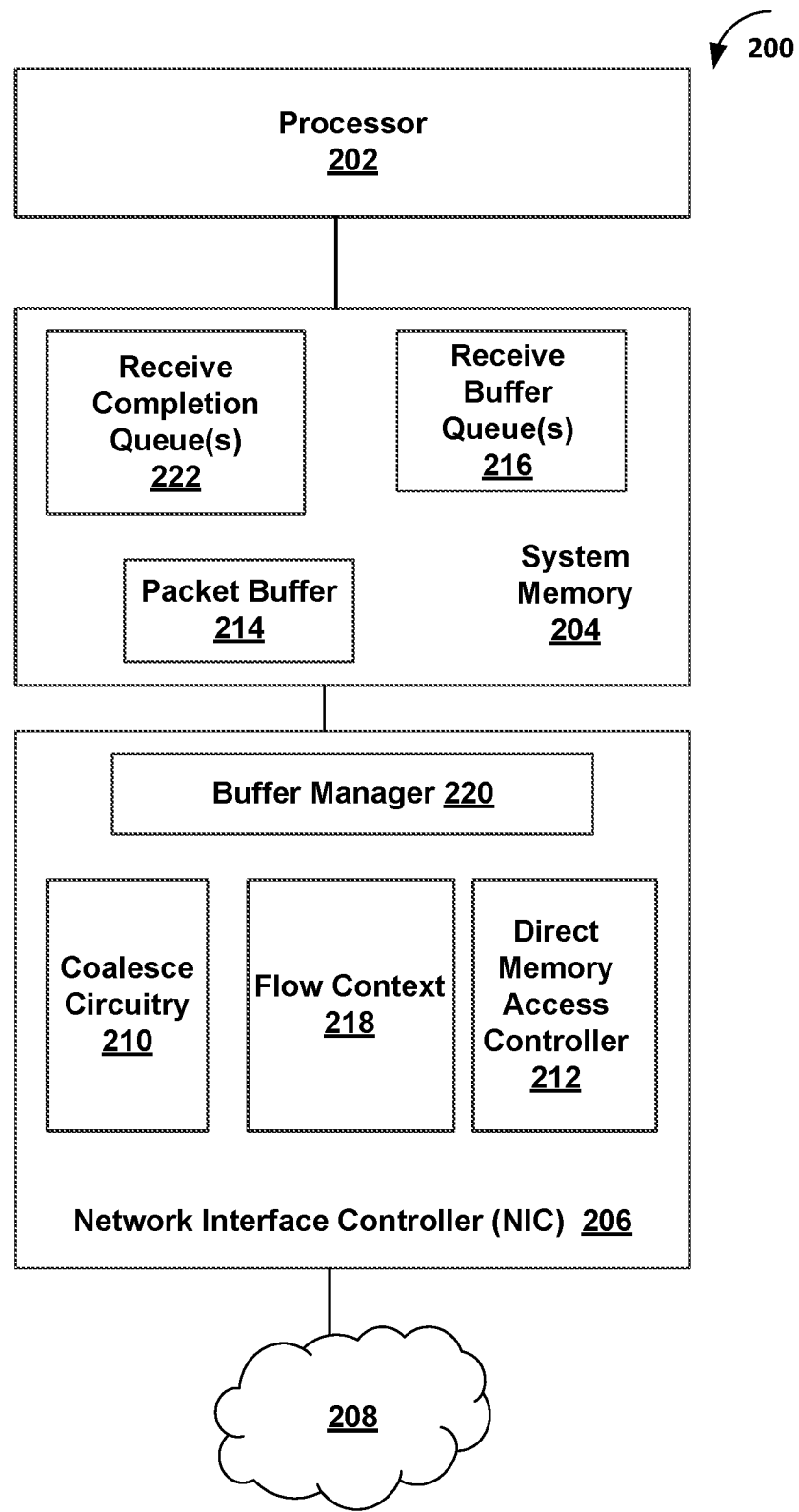
FIG. 2 is a block diagram of a system that includes a processor, memory and network interface controller to coalesce multiple received packets for a given TCP/IP flow into a single TCP/IP packet.

FIG. 2 is a block diagram of a system 200 that includes a processor 202, system memory 204 and network interface controller 206 to coalesce multiple received packets for a given TCP/IP flow into a single TCP/IP packet.

The network interface controller 206 receives TCP/IP packets from network 208. The TCP/IP packets for a TCP/IP flow (for example, identified by a tuple formed by a combination of the protocol type, IP source address and IP destination address in the IP header and the TCP source port number and TCP destination port number in the TCP header) are coalesced into a single TCP/IP packet in coalesce circuitry 210.

The network interface controller 206 stores the received TCP/IP packet's header and payload for potential coalescing with subsequent received TCP/IP packets for a same TCP/IP flow. The payload in the received TCP/IP packet are stored in receive buffer(s) in receive buffer queues 216 in system memory 204. In an embodiment, a Direct Memory Access Controller (DMAC) 212 in the network interface controller 206 can initiate a Direct Memory Access (DMA) operation to store the payload of the TCP/IP payload in a buffer allocated for the TCP/IP flow in receive buffer queues 216 in the system memory 204. A packet buffer in packet buffers 214 in which to store the TCP/IP payload is identified in a flow context 218 assigned to the TCP/IP flow. The flow context 218 may also be referred to as metadata.

The receive buffer posting mechanism is decoupled from the receive buffer completion mechanism through the use of the receive buffer queue(s) 216 and the receive completion queue(s) 222. For Receive Segment Coalescing, this allows the network interface controller 206 to coalesce received packet payload data and header into buffers assigned (posted) via Receive buffer queues 216 in system memory 204 and metadata in memory in the network interface controller 206. When the coalesced packet is ready to be processed by a networking stack, the received coalesced packet is completed contiguously in the receive completion queue 222 in system memory 204. Software and hardware flows are both simplified by waiting to complete the Receive Side Coalescing request until it's ready to be consumed by the networking stack.

Figures 3A, 3B:
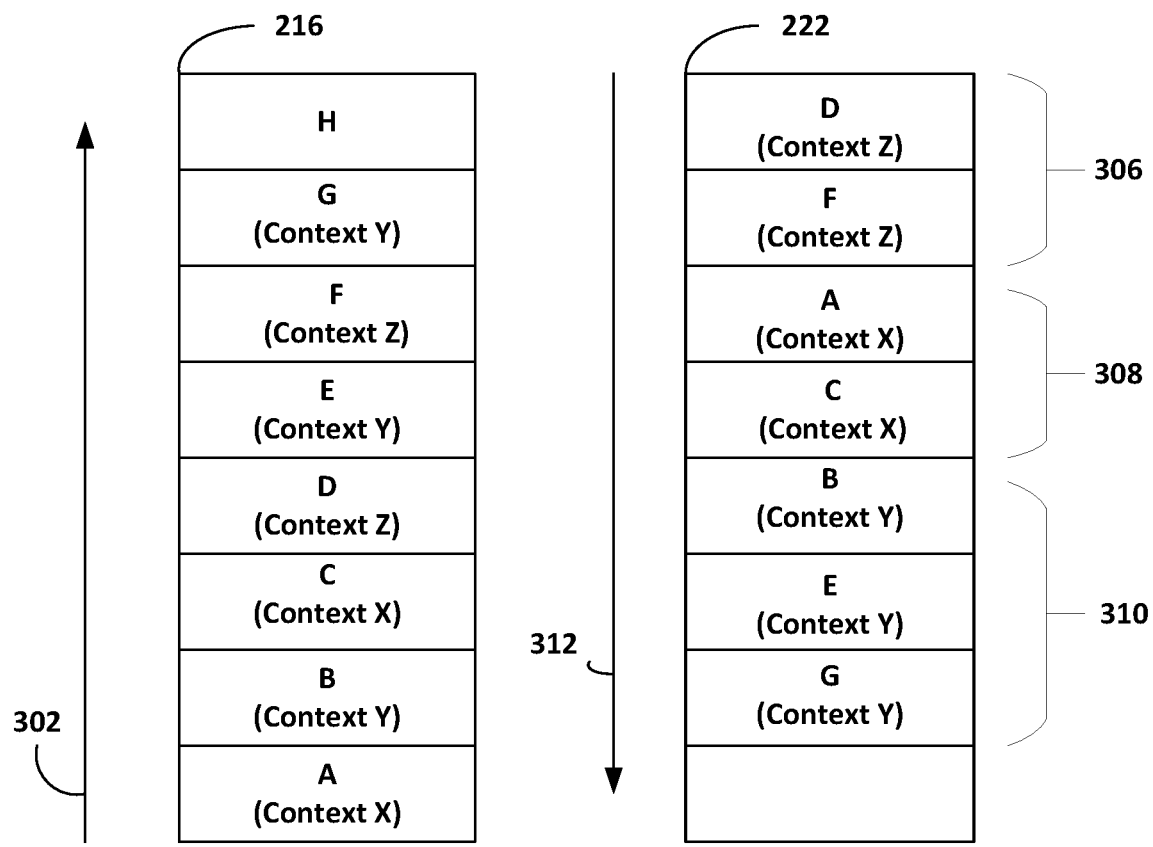
FIG. 3A illustrates an embodiment of the receive buffer queue in system memory to manage buffers allocation of Receive Segment Coalescing in the system shown in FIG. 2.
FIG. 3B illustrates an embodiment of the receive completion queue in the network interface controller to manage completions of Receive Segment Coalescing in the system shown in FIG. 2.

FIG. 3A illustrates an embodiment of the receive buffer queue 216 in system memory 204 to manage buffers allocation of Receive Segment Coalescing (RSC) in the system 200 shown in FIG. 2.

FIG. 3B illustrates an embodiment of the receive completion queue 222 in system memory 204 to manage completions of Receive Segment Coalescing in the system 200 shown in FIG. 2.

Turning to FIG. 3A, a receive buffer queue 216 in system memory 204 is a queue of buffers that can be allocated to a TCP/IP flow to store payload in received TCP/IP packets. The first packet in the TCP/IP flow is marked for coalescing by the network interface controller (NIC) 206. The buffer management module 220 allocates the next available buffer in the Receive Buffer Queue 216 to the TCP/IP flow. The metadata required to manage the coalesced packet can be referred to as a Receive Segment Coalescing context. The Direct Memory Access Controller 212 in the network interface controller 206 writes the packet data in the payload of the received packet to the allocated buffer posted on the Receive Buffer Queue 216 in system memory 204 and updates the associated Receive Segment Coalescing context in flow context 218. As subsequent packets are received by the network interface controller 206 marked for coalescing to the same Receive Segment Coalescing context, the buffer management module 220 (buffer manager 220) compares remaining space in the already-allocated buffer with the number of bytes of data in the payload of the current packet. If needed, the buffer management module 220 allocates another buffer assigned (posted) on the Receive Buffer Queue 216. For each subsequent packet received for the Receive Segment Coalescing context, the Direct Memory Access Controller 212 appends the packet data and updates the header for the coalesced packet in the associated Receive Segment Coalescing context in flow context 218. When the coalesced packet is ready to be consumed by the network stack, the Direct Memory Access Controller 212, updates the header and writes descriptors associated with all buffers associated with the Receive Segment Coalescing context consecutively in the receive completion queue 222. The buffers associated with the Receive Segment Coalescing context may or may not have been consecutive on the receive Buffer Queue 216.

In the example of the receive Buffer Queue 216 shown in FIG. 3A, a receive buffer queue portion 300 of the receive Buffer Queue 216 with eight contiguous buffers is shown. The eight buffers are labelled A-H and are buffers that are allocated in direction 302. Seven of the eight buffers are allocated dynamically to Receive Segment Coalescing contexts (TCP/IP flows) labeled X, Y and Z. Each Receive Segment Coalescing context is associated with one or more buffers in the receive buffer queue portion 300 of the receive Buffer Queue 216 to store packet data coalesced from received TCP/IP packets for a TCP/IP flow. For example, buffers A and C are associated with Receive Segment Coalescing context X, buffers D and F are associated with Receive Segment Coalescing context Z and buffers B, E and G are associated with Receive Segment Coalescing context Y.

Turning to FIG. 3B, a completion queue portion 304 of the receive completion queue 222 is shown. The completion queue portion 304 includes seven contiguous buffers that are processed starting at the top of the queue in direction 312. Buffers are completed contiguously on a descriptor ring for a Receive Segment Coalescing context when the coalesced packet is ready to be consumed by the network stack. In the example shown in FIG. 3B, context Z, associated with buffers D and F in the receive buffer queue 216, completes first and the first two descriptor slots 306 in the completion queue portion 304 of the receive completion queue 222 are allocated to context Z to store the packet data contiguously in the completion queue portion 304 of the receive completion queue 222. When context X completes, the next two descriptor slots 308 in the completion queue portion 304 of the receive completion queue 222 are allocated to context X to store the packet data descriptors associated with buffers A and C. When context Y completes, the next three descriptor slots 310 in the completion queue portion 304 of the receive completion queue 222 are allocated to context Y to store the packet data descriptors associated with buffers B, E and G.

An embodiment has been described for a TCP/IP flow. In another embodiment, the flow can be a QUIC transport protocol flow. QUIC is a UDP-based stream-multiplexing, encrypted transport protocol described in Internet Engineering Task Force (IETF) draft-ietf-quic-transport-27.

Figure 4:
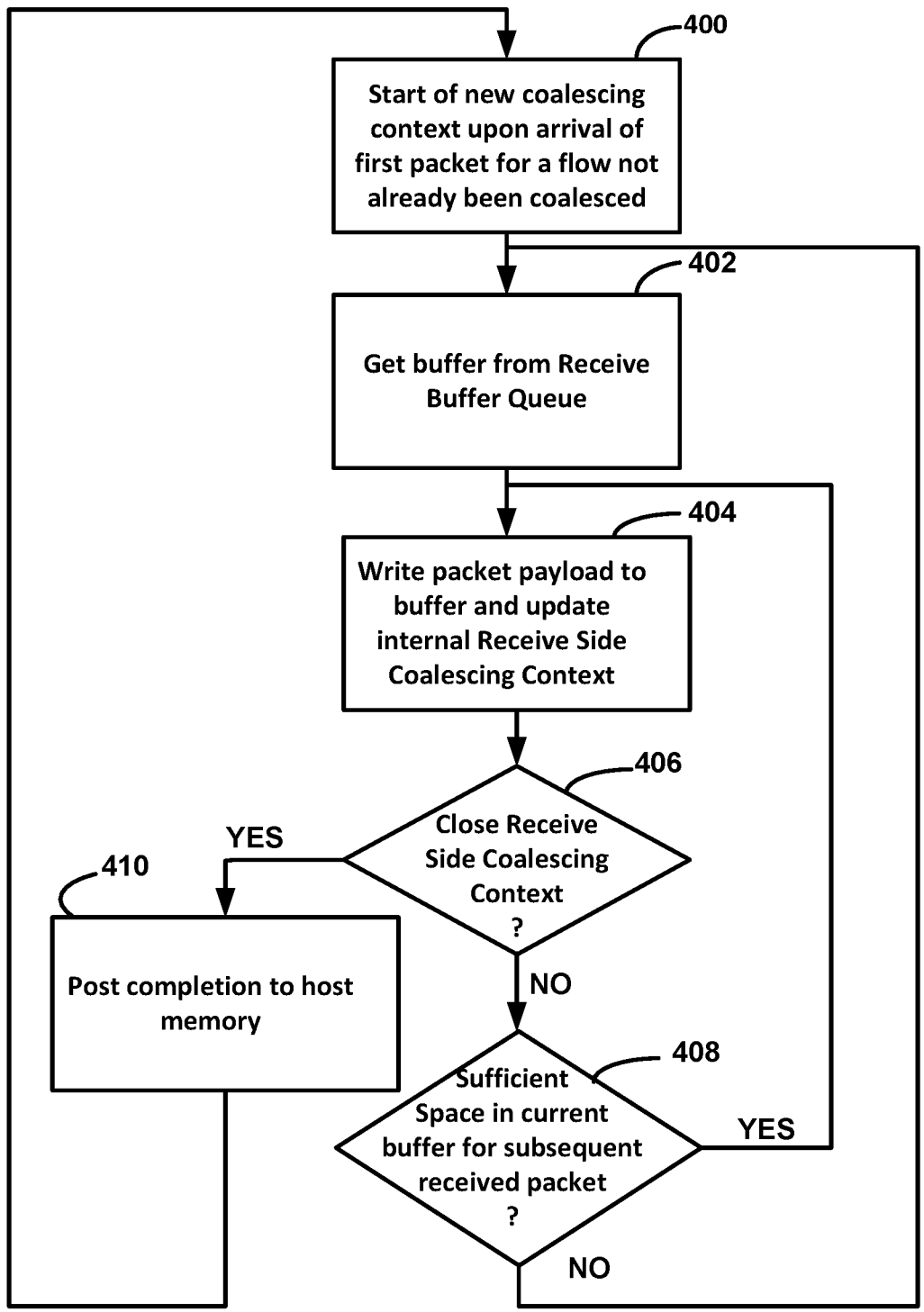
FIG. 4 is a flowgraph illustrating a method to perform Receive Segment Coalescing in the system shown in FIG. 2.

FIG. 4 is a flowgraph illustrating a method to perform Receive Segment Coalescing in the system 200 shown in FIG. 2.

At block 400, at the start of new coalescing context, upon arrival of first packet for a flow not already been coalesced, processing continues with block 402.

At block 402, a buffer management module 220 gets the next available buffer in the Receive Buffer Queue 216 to store payload in packets received for the Receive Segment Coalescing context. Processing continues with block 404.

At block 404, the Direct Memory Access Memory Controller 212 writes the packet data (stored in the payload of the received packet) in the buffer and updates the Receive Segment Coalescing Context. Processing continues with block 406.

At block 406, if it is time to close the Receive Segment Coalescing Context, processing continues with block 400 to start processing a next Receive Segment Coalescing Context. If not, processing continues with block 408.

At block 408, if there is sufficient space in the buffer to store data for a subsequent received packet for the Receive Segment Coalescing context, processing continues with block 404 to write the packet payload to the buffer. If not, processing continues with block 402 to get another buffer from the Receive Buffer queue 216 to store packet payload for the Receive Segment Coalescing context.

At block 410, the completion is posted to system memory 204. Processing continues with block 400 to start processing a next Receive Segment Coalescing Context.

Figure 5:
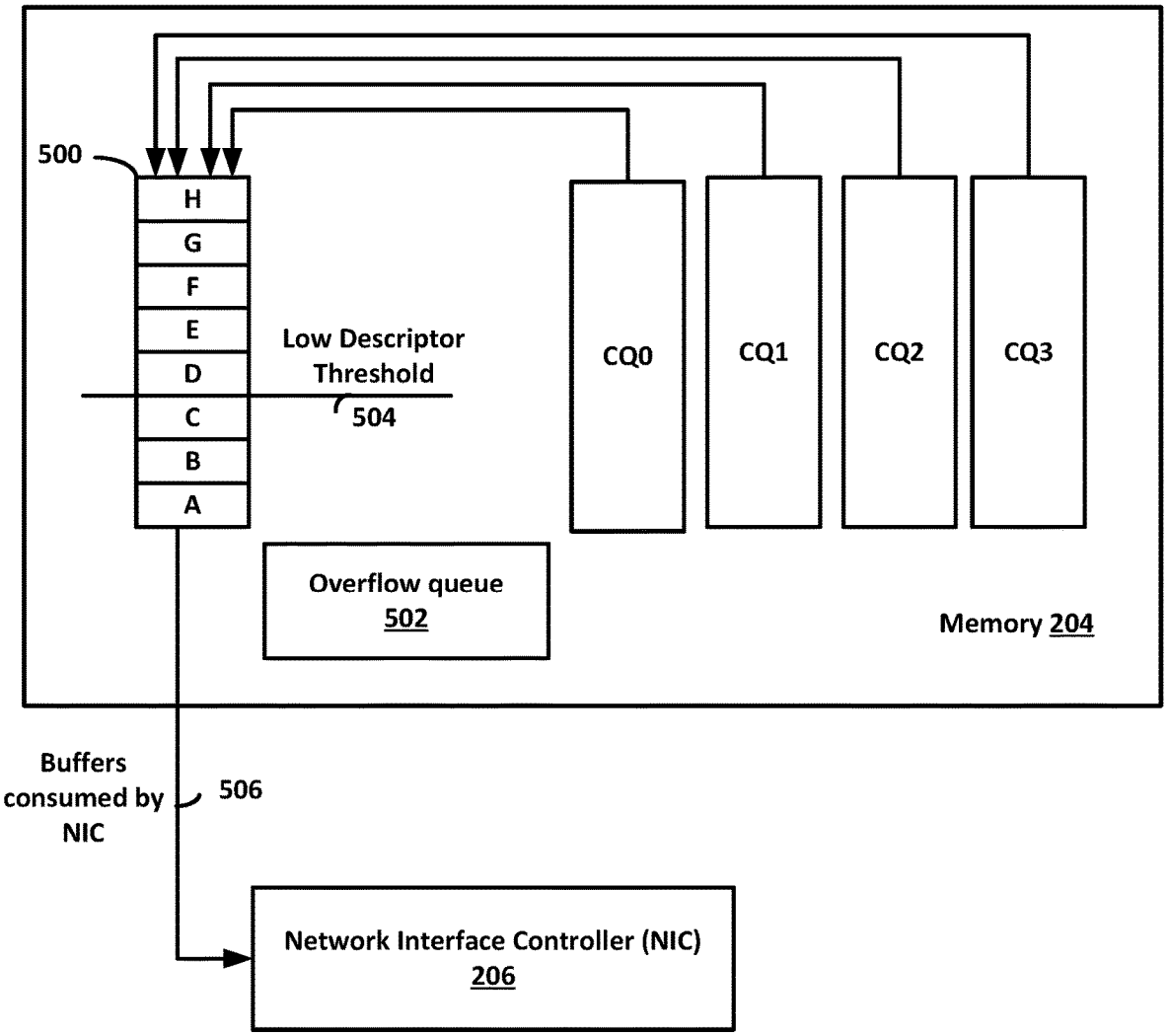
FIG. 5 illustrates an embodiment of dynamic receive buffer usage in system memory in the system shown in FIG. 2.

FIG. 5 illustrates an embodiment of dynamic receive buffer usage in system memory 204 in the system shown in FIG. 2. System performance is optimized when a small number of receive buffers are reused quickly to minimize the memory footprint of the memory allocated to store packet data. The number of receive completion queues 222 can be selected based on the maximum number of processor cores needed to meet performance requirements for packet processing. A small subset of receive buffer in a cache that uses a Most Recently Used (MRU) cache algorithm, that can be called the working set are used to minimize the amount of system memory 204 that is provisioned for receive buffer queues 216. The small subset of receive buffers increases the probability that a given receive buffer will be in cache improving the performance of an application using the received packet data in normal operation. The remainder of the provisioned buffers are set aside in a buffer overflow queue 502 and only assigned (posted) to the network interface controller 206 if the small working set of buffers (working set) is not sufficient to keep up with the received packet rate.

In the embodiment shown in FIG. 5, there is one receive buffer queue 500 with contiguous buffers labeled A-H and four receive completion queues labeled CQ0, CQ1, CQ2 and CQ3. Each respective receive completion queue CQ0, CQ1, CQ2, CQ3 has 4096 entries (descriptor entries for completing buffers). The receive buffer queue 500 may be allocated 4096 receive buffers, a working set of 1024 receive buffers and a buffer low threshold of 256 receive buffers. The receive buffer queue 500 can be used to assign an empty buffer to store packet data received by the network interface controller 206 for a TCP/IP flow as discussed in conjunction with FIG. 2 and FIGS. 3A-3B.

The receive completion queues CQ0, CQ1, CQ2, CQ3 are used to pass receive completions (filled buffers) from the network interface controller 206 to the networking stack. The receive queue group includes the receive buffer queues 500 and their associated receive completion queues CQ0, CQ1, CQ2, CQ3. The buffer set is the maximum number of in-flight buffers allowed for this receive queue group (i.e. 4096 in this example). The working set is the current number of in-flight receive buffers for a given receive queue group. The buffer overflow queue is a queue or counter to store allocated buffers which are not part of the working set. The buffer low threshold is a watermark where the network driver is notified to post additional receive buffers.

Figure 6:
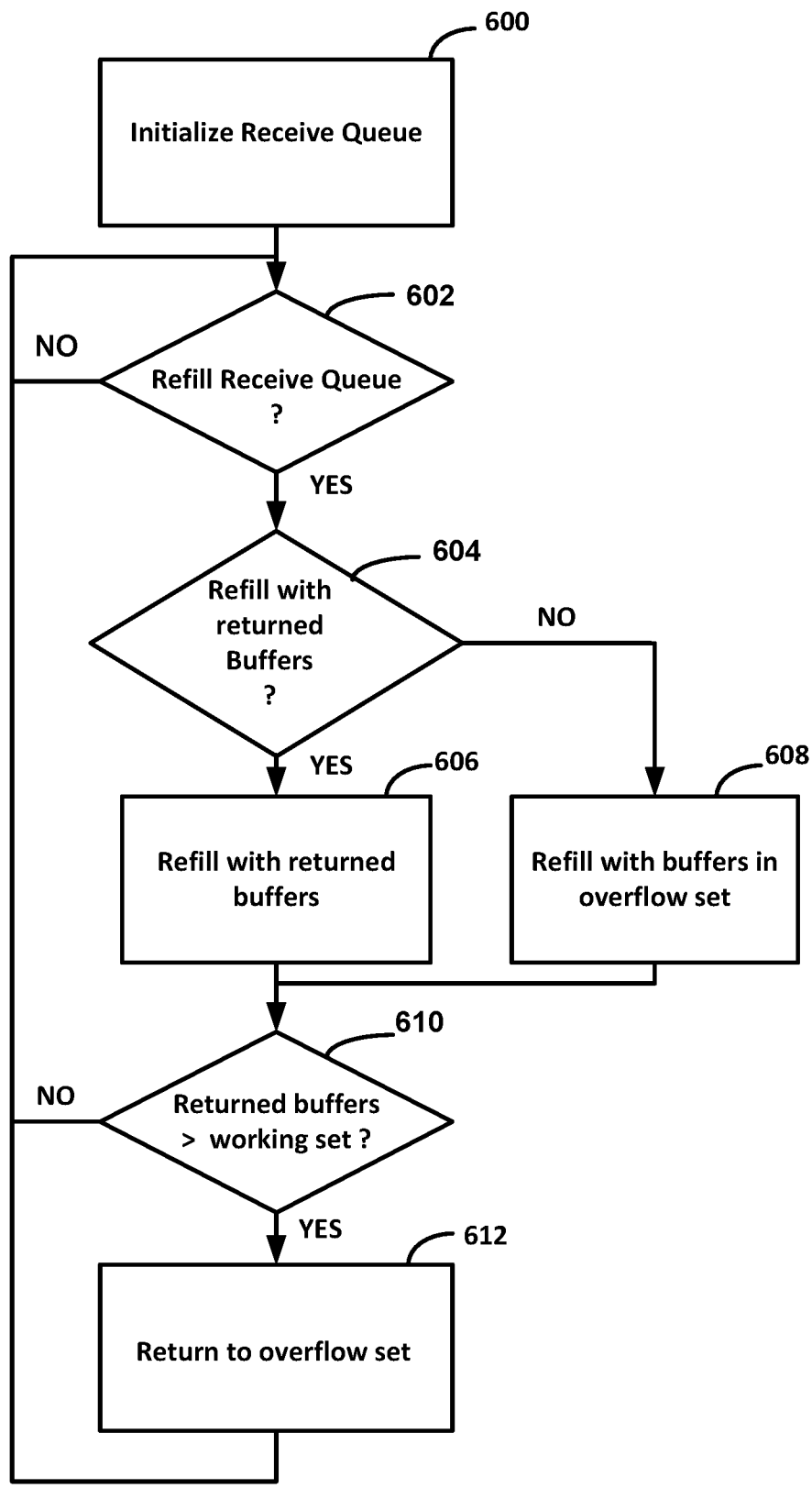
FIG. 6 is a flowgraph illustrating a method for dynamic receive buffer usage using the receive buffer queue with contiguous buffers labeled A-H and receive completion queues shown in FIG. 5.

FIG. 6 is a flowgraph illustrating a method for dynamic receive buffer usage using the receive buffer queue 500 with contiguous buffers labeled A-H and receive completion queues shown in FIG. 5.

At initialization time in block 600, each receive buffer queue 500 is provisioned so that it can absorb a buffer set number of receive buffers (i.e. 4096). The working set number of receive buffers (i.e. 1024) are assigned (posted) to the receive buffer queue 500. The remaining receive buffers (i.e. 3072) are assigned to the buffer overflow queue 502. It is not necessary to pre-allocate the buffers for the buffer overflow queue 502; the buffer overflow queue 502 can be implemented as an atomic counter if subsequent buffer allocation is preferable from a system perspective (i.e. it is guaranteed to succeed and can be performed efficiently).

At block 602, a buffer refill thread can be interrupt-driven based on buffer consumption by the network interface controller 206. The network interface controller 206 can generate an interrupt when the number of descriptor entries in the receive buffer queue 500 is less than a low descriptor threshold 504 or if there is an interrupt moderation timer expiration. In response to receiving an interrupt to refill, processing continues with block 604.

At block 604, if buffers from the working set have been returned to the working set, processing continues with block 606. If the receive completion queue threads do not return buffers fast enough, and the number of allocated buffers drops below a threshold (for example, 256), processing continues with block 608.

At block 606, the buffer refill thread refills the receive buffer queue 216 using buffers returned to buffer refill thread from the threads processing the receive completion queues CQ0, CQ1, CQ2, CQ3. Processing continues with block 610.

At block 608, the buffer refill thread fails over to the buffer overflow queue 502 to obtain receive buffers for the receive buffer queue 500. Processing continues with block 610.

At block 610, if there are more buffers available than can be allocated to the network interface controller 206, processing continues with block 612.

At block 612, the buffers are returned to the buffer overflow queue 502.

Figure 7:
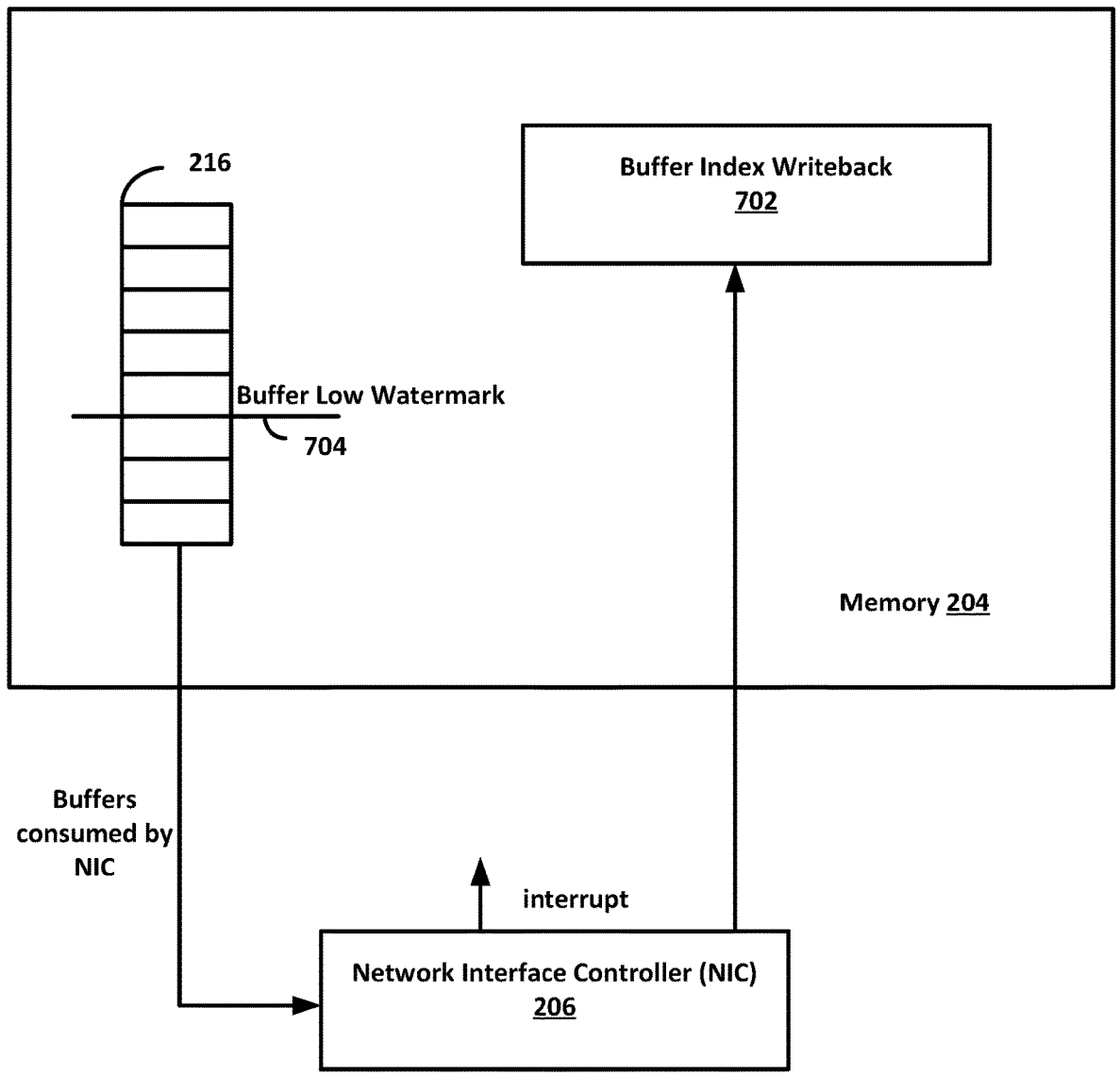
FIG. 7 is an embodiment of an optimized buffer queue refill mechanism.

FIG. 7 is an embodiment of an optimized buffer queue refill mechanism. In a split receive queue model as discussed in conjunction with FIG. 3A and FIG. 3B, receive buffers may be assigned for use by the network interface controller 206 for a long period of time before being returned. Therefore, the network stack cannot rely on buffer completion to system memory 204 happening in a timely manner to know when to allocate new buffers to the network interface controller 206.

In prior art receive queue models, the network stack relies on buffer completions to signal buffer consumption by the network interface controller 206. However, per-buffer consumption notifications result in an unnecessarily high level of communication between the network interface controller 206 and the network stack.

If the status of the buffer queue is written to the receive completion queues, the network stack would need to synchronize the status across all of the completion queues using a single buffer queue. This is inefficient and can require locks (which would be likely to experience contention). Relying on buffer completions is not feasible when the network interface controller 206 may hold on to receive buffers for an arbitrarily long time before returning them to the device driver for the network stack.

In this embodiment, the receive buffer queue 216 is treated as an independent entity in terms of its feedback mechanism with the network stack. A buffer notification stride is a batch size for notifying the network stack of buffers used by the network interface controller 206. The network stack sets up a configurable buffer notification stride, and the network interface controller 206 writes its status to system memory 204 whenever the network interface controller 206 crosses a multiple of the buffer notification stride. The network interface controller 206 interrupts the device driver for the network stack to refill the NIC's receive buffer queue based on either timers or crossing below a configurable low watermark.

A Software Notification Timer is the usual interval between interrupts to the network stack for the purpose of refilling the Rx Buffer Queue. The Buffer Low Watermark 704 is the threshold for generating an immediate interrupt to the network stack for the purpose of refilling the receive buffer queue 216.

Figure 8:
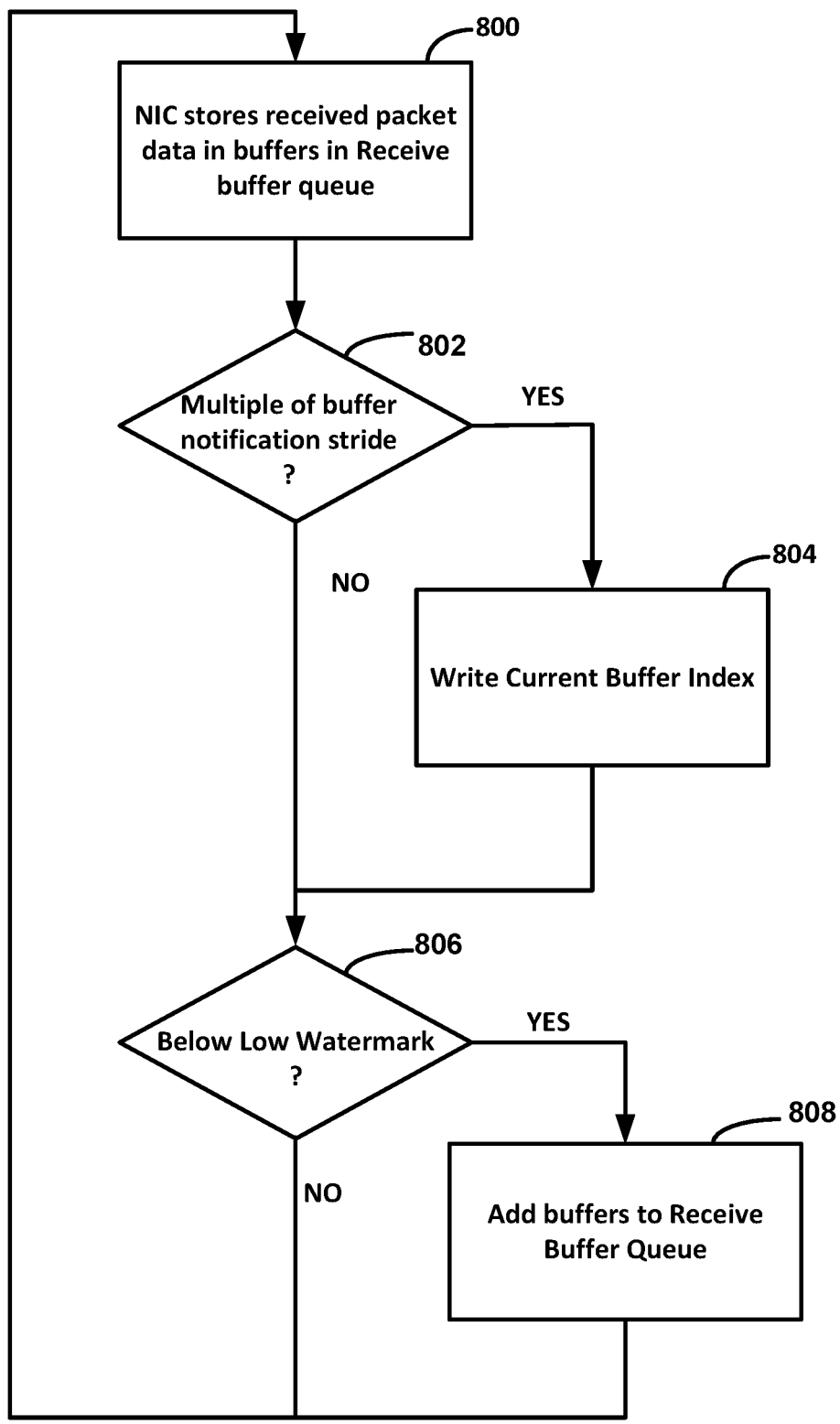
FIG. 8 is a flowgraph illustrating a method for refilling the receive buffer queue shown in FIG. 5.

FIG. 8 is a flowgraph illustrating a method for refilling the receive buffer queue 216 shown in FIG. 5

At block 800, the network interface controller 206 receives packets and consumes buffers from the Rx Buffer Queue in order to post packet data to system memory 204. When the network interface controller 206 crosses an index with a multiple of the Buffer Notification Stride on the receive Buffer Queue 216, the network interface controller 206 writes the current buffer index to a pre-configured fixed location 702 in system memory 204.

The network interface controller 206 generates interrupts based on the interval specified in the software notification timer. If the number of buffers in the Receive Buffer Queue 216 falls below the Buffer Low Watermark, the network interface controller 206 generates an immediate interrupt. The network interface controller 206 can also generate an interrupt when there is an Interrupt Moderation Timer expiration.

In the interrupt handler, the network stack refills the Receive Buffer Queue 216 according to its buffer refill policy.

The network interface controller 206 can also generate an interrupt when there is an Interrupt Moderation Timer expiration.

Figure 9:
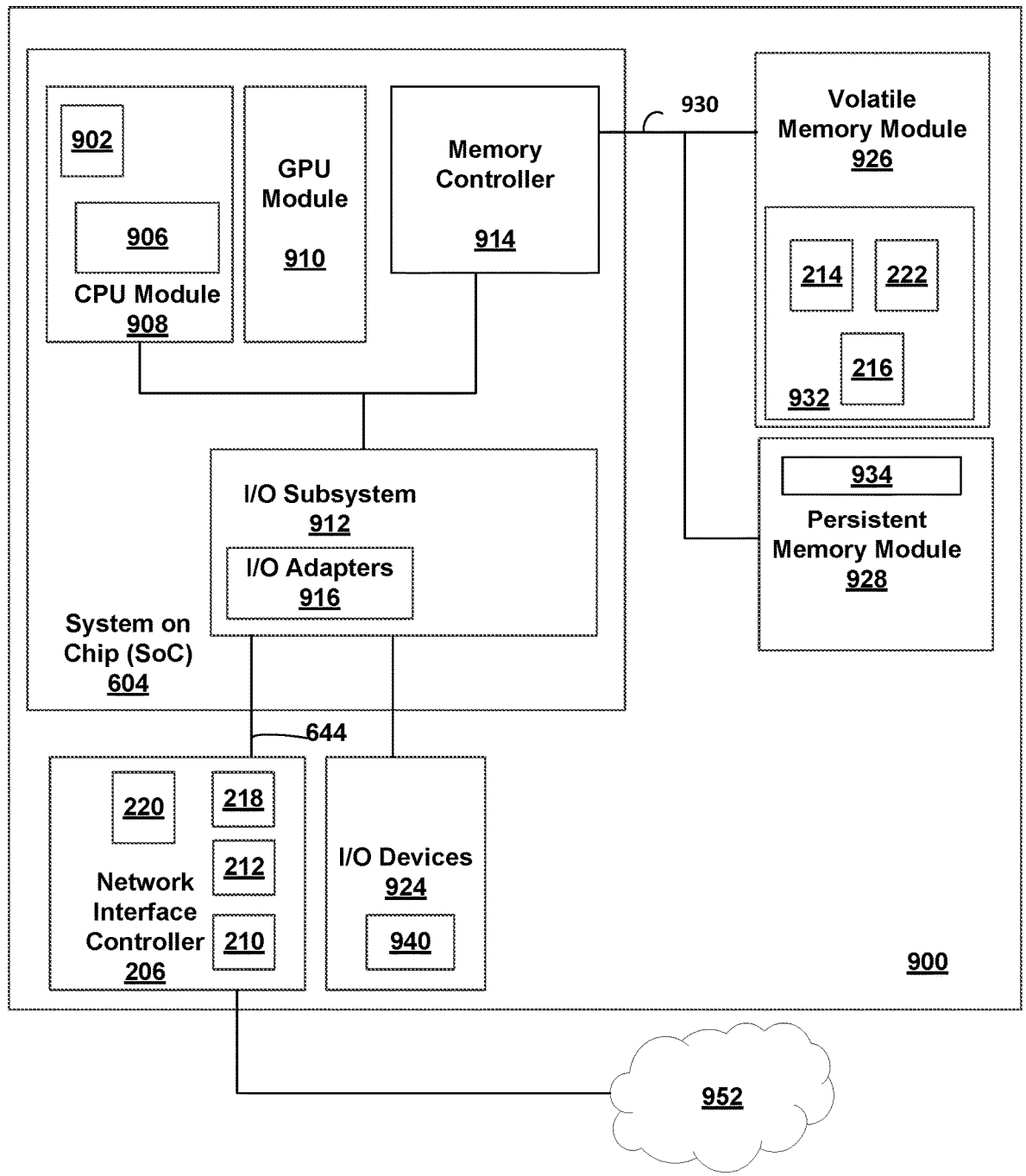
FIG. 9 is a block diagram of an embodiment of a server in a cloud computing system.

FIG. 9 is a block diagram of an embodiment of a server 900 in a cloud computing system. Server 900 includes a system on chip (SOC or SoC) 904 which combines processor, graphics, memory, and Input/Output (I/O) control logic into one SoC package. The I/O adapter(s) 916 may include a Peripheral Component Interconnect Express (PCIe) adapter that is communicatively coupled over bus 944 to a network interface controller 206.

The SoC 904 includes at least one Central Processing Unit (CPU) module 908, a memory controller 914, and a Graphics Processor Unit (GPU) module 910. In other embodiments, the memory controller 914 may be external to the SoC 904. The CPU module 908 includes at least one processor core 902 and a level 2 (L2) cache 906.

Although not shown, the processor core 902 may internally include one or more instruction/data caches (L1 cache), execution units, prefetch buffers, instruction queues, branch address calculation units, instruction decoders, floating point units, retirement units, etc. The CPU module 908 may correspond to a single core or a multi-core general purpose processor, such as those provided by Intel® Corporation, according to one embodiment. In an embodiment the SoC 904 may be an Intel® Xeon® Scalable Processor (SP) or an Intel® Xeon® data center (D) SoC.

The memory controller 914 may be coupled to a persistent memory module 928 and a volatile memory 926 via a memory bus 930. The persistent memory module 928 may include one or more persistent memory device(s) 934. The persistent memory module 928 can be a dual-in-line memory module (DIMM) or a small outline dual in-line memory module (SO-DIMM).

The packet buffers 214 receive buffer queue(s) 216 and receive completion queue(s) 222 can be stored in volatile memory integrated circuits 932. In another embodiment, the packet buffers 214, receive buffer queue(s) 216 and receive completion queue(s) 222 can be stored in persistent memory device(s) 934 in the persistent memory module 928.

In an embodiment, the buffer management module 220, receive buffer queue(s) 216 and receive completion queue(s) 222 can be included in operating systems such as Microsoft® Windows® (Network Driver Interface System (NDIS) or NetAdapter drivers), Linux® and VMware® ESX.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

Volatile memory is memory whose state (and therefore the data stored in it) is indeterminate if power is interrupted to the device. Dynamic volatile memory requires refreshing the data stored in the device to maintain state. One example of dynamic volatile memory includes DRAM (Dynamic Random Access Memory), or some variant such as Synchronous DRAM (SDRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version 3, JESD209-3B, August 2013 by JEDEC), LPDDR4) LPDDR version 4, JESD209-4, originally published by JEDEC in August 2014), WIO2 (Wide Input/Output version 2, JESD229-2 originally published by JEDEC in August 2014, HBM (High Bandwidth Memory, JESD325, originally published by JEDEC in October 2013, DDR5 (DDR version 5, currently in discussion by JEDEC), LPDDR5 (currently in discussion by JEDEC), HBM2 (HBM version 2), currently in discussion by JEDEC, or others or combinations of memory technologies, and technologies based on derivatives or extensions of such specifications. The JEDEC standards are available at www.jedec.org.

The Graphics Processor Unit (GPU) module 910 may include one or more GPU cores and a GPU cache which may store graphics related data for the GPU core. The GPU core may internally include one or more execution units and one or more instruction and data caches. Additionally, the Graphics Processor Unit (GPU) module 910 may contain other graphics logic units that are not shown in FIG. 9, such as one or more vertex processing units, rasterization units, media processing units, and codecs.

Within the I/O subsystem 912, one or more I/O adapter(s) 916 are present to translate a host communication protocol utilized within the processor core(s) 902 to a protocol compatible with particular I/O devices. Some of the protocols that I/O adapter(s) 916 may be utilized for translation include Peripheral Component Interconnect (PCI)-Express (PCIe); Universal Serial Bus (USB); Serial Advanced Technology Attachment (SATA) and Institute of Electrical and Electronics Engineers (IEEE) 1594 "Firewire".

The I/O adapter(s) 916 may communicate with external I/O devices 924 which may include, for example, user interface device(s) including a display and/or a touch-screen display 940, printer, keypad, keyboard, communication logic, wired and/or wireless, storage device(s) including hard disk drives ("HDD"), solid-state drives ("SSD"), removable storage media, Digital Video Disk (DVD) drive, Compact Disk (CD) drive, Redundant Array of Independent Disks (RAID), tape drive or other storage device. The storage devices may be communicatively and/or physically coupled together through one or more buses using one or more of a variety of protocols including, but not limited to, SAS (Serial Attached SCSI (Small Computer System Interface)), PCIe (Peripheral Component Interconnect Express), NVMe (NVM Express) over PCIe (Peripheral Component Interconnect Express), and SATA (Serial ATA (Advanced Technology Attachment)).

The network interface controller 206 includes coalesce circuitry 210, Direct Memory Access Controller (DMAC) 212, flow context 218 and the buffer management module 220 described in conjunction with FIG. 2.

Additionally, there may be one or more wireless protocol I/O adapters. Examples of wireless protocols, among others, are used in personal area networks, such as IEEE 802.15 and Bluetooth, 4.0; wireless local area networks, such as IEEE 802.11-based wireless protocols; and cellular protocols.

It is envisioned that aspects of the embodiments herein may be implemented in various types of computing and networking equipment, such as switches, routers and blade servers such as those employed in a data center and/or server farm environment. Typically, the servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers.

Each blade comprises a separate computing platform that is configured to perform server-type functions, that is, a server on a card. Accordingly, each blade includes components common to conventional servers, including a main printed circuit board (main board) providing internal wiring (i.e., buses) for coupling appropriate integrated circuits (ICs) and other components mounted to the board. These components may include the components discussed earlier in conjunction with FIG. 6.

Flow diagrams as illustrated herein provide examples of sequences of various process actions. The flow diagrams can indicate operations to be executed by a software or firmware routine, as well as physical operations. In one embodiment, a flow diagram can illustrate the state of a finite state machine (FSM), which can be implemented in hardware and/or software. Although shown in a particular sequence or order, unless otherwise specified, the order of the actions can be modified. Thus, the illustrated embodiments should be understood only as an example, and the process can be performed in a different order, and some actions can be performed in parallel. Additionally, one or more actions can be omitted in various embodiments; thus, not all actions are required in every embodiment. Other process flows are possible.

To the extent various operations or functions are described herein, they can be described or defined as software code, instructions, configuration, and/or data. The content can be directly executable ("object" or "executable" form), source code, or difference code ("delta" or "patch" code). The software content of the embodiments described herein can be provided via an article of manufacture with the content stored thereon, or via a method of operating a communication interface to send data via the communication interface.

Elements of the present invention may also be provided as a machine-readable medium for storing the machine-executable instructions. The machine-readable medium may include, but is not limited to, floppy diskettes, optical disks, CD-ROMs, and magneto-optical disks, FLASH memory, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to the disclosed embodiments and implementations of the invention without departing from their scope. Therefore, the illustrations and examples herein should be construed in an illustrative, and not a restrictive sense. The scope of the invention should be measured solely by reference to the claims that follow.

In general, with respect to the descriptions herein, in one example an apparatus includes: a network interface controller communicatively coupled to a memory, the memory to store a receive buffer queue comprising at least one receive buffer and a receive completion queue comprising at least one entry, the network interface controller to: coalesce received packet payload into receive buffers on the receive buffer queue; and write descriptors associated with the receive buffers for a same flow consecutively in the receive completion queue.

In one example, the flow is one of a Transport Control Protocol/Internet Protocol (TCP/IP) flow or a QUIC transport protocol flow. In one example, the network interface controller and the memory are in a data center server. In one example, received packet payload for a same flow is stored in non-contiguous buffers in the receive buffer queue. In one example, at least one processor core to: upon receiving notification that packets are ready to be processed, to access consecutive descriptors in the receive completion queue to access data stored in the memory. In one example, the buffers are processed contiguously on a descriptor ring for a receive segment coalescing context.

In general, with respect to the descriptions herein, in one example a method includes: storing, in a memory, a receive buffer queue comprising at least one receive buffer and a receive completion queue comprising at least one entry; coalescing received packet payload into receive buffers in the receive buffer queue; and writing descriptors associated with the receive buffers for a same flow consecutively in the receive completion queue.

In one example, the flow is one of a Transport Control Protocol/Internet Protocol (TCP/IP) flow or a QUIC transport protocol flow. In one example, the network interface controller and the memory are in a data center server. In one example, received packet payload for a same flow is stored in non-contiguous buffers in the receive buffer queue. In one example, upon receiving notification that packets are ready to be processed, accessing consecutive descriptors in the receive completion queue to access data stored in the memory. In one example, the buffers are processed contiguously on a descriptor ring for a receive segment coalescing context.

In general, with respect to the descriptions herein, in one example an apparatus includes: a memory to store a plurality of completion queues and a receive buffer queue comprising at least one receive buffer; and at least one processor core to: allocate a working set of receive buffers to the receive buffer queue to minimize an amount of memory provisioned for the receive buffer queue; refill the receive buffer queue using buffers returned from the plurality of completion queues; and allocate a buffer to the receive buffer queue from an overflow queue if a buffer is not available in the working set of receive buffers.

In one example, the apparatus includes a network interface controller, the network interface controller to store packet data in the buffer. In one example, each entry in a completion queue to store a descriptor to identify a filled buffer in the buffer queue. In one example, a number of buffers allocated to the working set and the overflow buffer is dependent on the number of entries in a completion queue. In one example, at least one processor core is to execute a buffer refill thread to refill the receive buffer queue with buffers returned from the completion queue or with buffers in the buffer overflow queue. In one example, the total number of buffers is 4096, the working set is 1024, the number of entries in the completion queue is 4096 and the buffer low threshold is 256. In one example, the processor and the memory are in a data center server.

In general, with respect to the descriptions herein, in one example a method includes: storing a completion queue and a receive buffer queue comprising at least one receive buffer in a memory; allocating a working set of receive buffers to the receive buffer queue to minimize an amount of memory provisioned for the receive buffer queue; refilling the receive buffer queue using receive buffers returned in the completion queue; and allocating a receive buffer to the receive buffer queue from an overflow queue if the receive buffer is not available in the working set of receive buffers.

In one example, the method includes storing, by a network interface controller, packet data in the receive buffer. In one example, the method includes storing, in an entry in the completion queue, a descriptor to identify a filled buffer in the receive buffer queue. In one example, a number of buffers allocated to the working set and the overflow buffer is dependent on the number of entries in the completion queue. In one example, at least one processor core is to execute a buffer refill thread to refill the receive buffer queue with buffers returned from the completion queue or with buffers in the buffer overflow queue. In one example, the total number of buffers is 4096, the working set is 1024, the number of entries in the completion queue is 4096 and the buffer low threshold is 256. In one example, the processor and the memory are in a data center server.

In general, with respect to the descriptions herein, in one example an apparatus includes: a memory, the memory to store a receive buffer queue comprising at least one receive buffer and a receive completion queue comprising at least one entry; and a network interface controller communicatively coupled to the memory, the network interface controller to: store received packet payload into receive buffers on the receive buffer queue; and write a current buffer index to a fixed location in memory to provide an indication of use of receive buffers on the receive queue.

In one example, the apparatus also includes: at least one processor core to monitor the fixed location in memory to determine when to refill the receive buffers in the receive buffer queue. In one example, the network interface controller and the memory are in a data center server. In one example, the network interface controller to generate an interrupt to request refill of receive buffers in the receive buffer queue if the number of receive buffers on the receive queue drops below a low watermark.

In general, with respect to the descriptions herein, in one example a method includes: storing, in a memory, a receive buffer queue comprising at least one receive buffer and a receive completion queue comprising at least one entry; and storing, by a network interface controller, received packet payload into receive buffers on the receive buffer queue; and writing, by a network interface controller, a current buffer index to a fixed location in memory to provide an indication of use of receive buffers on the receive queue.

In one example, the method includes monitoring, by a processor core, the fixed location in memory to determine when to refill the receive buffers in the receive buffer queue. In one example, the network interface controller and the memory are in a data center server. In one example, the method includes generating, by the network interface controller, an interrupt to request refill of receive buffers in the receive buffer queue if the number of receive buffers on the receive queue drops below a low watermark.

What is claimed is:

1. An apparatus comprising:
a network interface controller to couple to a memory, the memory to store a receive buffer queue comprising at least one receive buffer and a receive completion queue comprising at least one entry, the network interface controller to:
store received packet payloads for a Receive Segment Coalescing context in receive buffers on the receive buffer queue; and
write descriptors associated with all the receive buffers associated with the Receive Segment Coalescing context in consecutive entries in the receive completion queue after all the received packet payloads for the Receive Segment Coalescing context have been stored in the receive buffer queue.

2. The apparatus of claim 1, wherein the Receive Segment Coalescing context is one of a Transmission Control Protocol/Internet Protocol (TCP/IP) flow or a QUIC transport protocol flow.

3. The apparatus of claim 1, wherein the network interface controller and the memory are in a data center server.

4. The apparatus of claim 1, wherein received packet payloads for the Receive Segment Coalescing context are stored in non-contiguous buffers in the receive buffer queue.

5. The apparatus of claim 1, further comprising:
at least one processor core to:
upon receiving notification that received packet payloads for the Receive Segment Coalescing context are ready to be processed, to access consecutive descriptors in the receive completion queue to access data stored in the memory.

6. The apparatus of claim 1, wherein the network interface controller to:
store received packet payloads in receive buffers on the receive buffer queue; and
write a current buffer index to a fixed location in memory to provide an indication of use of receive buffers on the receive buffer queue.

7. The apparatus of claim 1, wherein the receive buffers are processed contiguously for the receive segment coalescing context.

8. A method comprising:
storing, in a memory, a receive buffer queue comprising at least one receive buffer and a receive completion queue comprising at least one entry;
storing received packet payloads for a Receive Segment Coalescing context in receive buffers in the receive buffer queue; and
writing descriptors associated with all the receive buffers for associated with the Receive Segment Coalescing context in consecutive entries in the receive completion queue after all the received packet payloads for the Receive Segment Coalescing context have been stored in the receive buffer queue.

9. The method of claim 8, wherein the Receive Segment Coalescing context is one of a Transmission Control Protocol/Internet Protocol (TCP/IP) flow or a QUIC transport protocol flow.

10. The method of claim 8, wherein received packet payloads for the Receive Segment Coalescing context are stored in non-contiguous buffers in the receive buffer queue.

11. The method of claim 8, further comprising:
upon receiving notification that received packet payloads for the Receive Segment Coalescing context are ready to be processed, accessing consecutive descriptors in the receive completion queue to access data stored in the memory.

12. The method of claim 8, further comprising:
storing, by a network interface controller, received packet payloads in receive buffers on the receive buffer queue; and
writing, by a network interface controller, a current buffer index to a fixed location in memory to provide an indication of use of receive buffers on the receive buffer queue.

13. A system comprising:
a memory module, the memory module comprising at least one volatile memory integrated circuit, the volatile memory integrated circuit to store a receive buffer queue comprising at least one receive buffer and a receive completion queue comprising at least one entry; and
a network interface controller to couple to the memory module, the network interface controller to:
store received packet payloads for a Receive Segment Coalescing context in receive buffers on the receive buffer queue; and
write descriptors associated with all the receive buffers associated with the Receive Segment Coalescing context in consecutive entries in the receive completion queue after all the received packet payloads for the Receive Segment Coalescing context have been stored in the receive buffer queue.

14. The system of claim 13, wherein the Receive Segment Coalescing context is one of a Transmission Control Protocol/Internet Protocol (TCP/IP) flow or a QUIC transport protocol flow.

15. The system of claim 13, further comprising:
at least one processor core to:
upon receiving notification that packets are ready to be processed, to access consecutive descriptors in the receive completion queue to access data stored in the memory module.

16. The system of claim 15, wherein the at least one processor core to:
allocate a working set of receive buffers to the receive buffer queue to minimize an amount of memory provisioned for the receive buffer queue;
refill the receive buffer queue, using receive buffers returned from the receive completion queue; and
allocate a buffer to the receive buffer queue from an overflow queue if a buffer is not available in the working set of receive buffers.

17. The system of claim 16, wherein the network interface controller to:
store received packet payloads in receive buffers on the receive buffer queue; and
write a current buffer index to a fixed location in memory to provide an indication of use of receive buffers on the receive buffer queue.

18. The system of claim 15, wherein the receive buffers are processed contiguously for the receive segment coalescing context.

19. A non-transitory machine-readable medium for storing machine-executable instructions that, cause a system to:
store, in a memory, a receive buffer queue comprising at least one receive buffer and a receive completion queue comprising at least one entry;
store received packet payloads for a Receive Segment Coalescing context in receive buffers on the receive buffer queue; and
write descriptors associated with all the receive buffers associated with the Receive Segment Coalescing context in consecutive entries in the receive completion queue after all the received packet payloads for the Receive Segment Coalescing context have been stored in the receive buffer queue.

20. The non-transitory machine-readable medium of claim 19, wherein received packet payloads for the Receive Segment Coalescing context are stored in non-contiguous buffers in the receive buffer queue.

21. The non-transitory machine-readable medium of claim 19, further comprising:
upon receiving notification that packets are ready to be processed, access consecutive descriptors in the receive completion queue to access data stored in the memory.

22. The non-transitory machine-readable medium of claim 19, further comprising:
store, by a network interface controller, received packet payloads in receive buffers on the receive buffer queue; and
write, by a network interface controller, a current buffer index to a fixed location in memory to provide an indication of use of receive buffers on the receive buffer queue.

* * * * *